(12) United States Patent
Jacquet et al.

(10) Patent No.: US 6,681,236 B2
(45) Date of Patent: Jan. 20, 2004

(54) METHOD OF PERFORMING OPERATIONS WITH A VARIABLE ARITHMETIC

(75) Inventors: David Jacquet, Montbonnot (FR); Pascal Fouilleul, Saint Ismier (FR)

(73) Assignee: STMicroelectronics S.A., Gentilly (FR)

( * ) Notice: Subject to any disclaimer, the term of this patent is extended or adjusted under 35 U.S.C. 154(b) by 578 days.

(21) Appl. No.: 09/738,132

(22) Filed: Dec. 15, 2000

(65) Prior Publication Data

US 2001/0004740 A1 Jun. 21, 2001

(30) Foreign Application Priority Data

Dec. 21, 1999 (FR) .......................................... 99 16177

(51) Int. Cl.$^7$ ................................................ G06F 7/50
(52) U.S. Cl. ....................................... 708/513; 708/706
(58) Field of Search ................... 708/513, 706

(56) References Cited

U.S. PATENT DOCUMENTS

| 3,683,163 | A |   | 8/1972 | Hanslip ........................ 235/173 |
|-----------|---|---|--------|---------------------------------------|
| 4,161,784 | A | * | 7/1979 | Cushing et al. ............. 708/513   |
| 5,189,636 | A | * | 2/1993 | Patti et al. ................... 708/706 |
| 5,640,578 | A | * | 6/1997 | Balmer et al. .............. 712/221   |
| 6,016,538 | A | * | 1/2000 | Guttag et al. .................. 712/32  |
| 6,219,688 | B1 | * | 4/2001 | Guttag et al. ............... 708/709   |

* cited by examiner

Primary Examiner—David H. Malzahn
(74) Attorney, Agent, or Firm—Lisa K. Jorgenson; Allen, Dyer, Doppelt, Milbrath & Gilchrist, P.A.

(57) ABSTRACT

The process for performing operations with a variable arithmetic does not call for any shifting of the data in the different registers that come into play in the operation. The input registers can have empty parts which are completed by appropriate bit sequences to ensure a propagation of a possible outgoing carry over in order to recover that carry over from a result register.

13 Claims, 2 Drawing Sheets

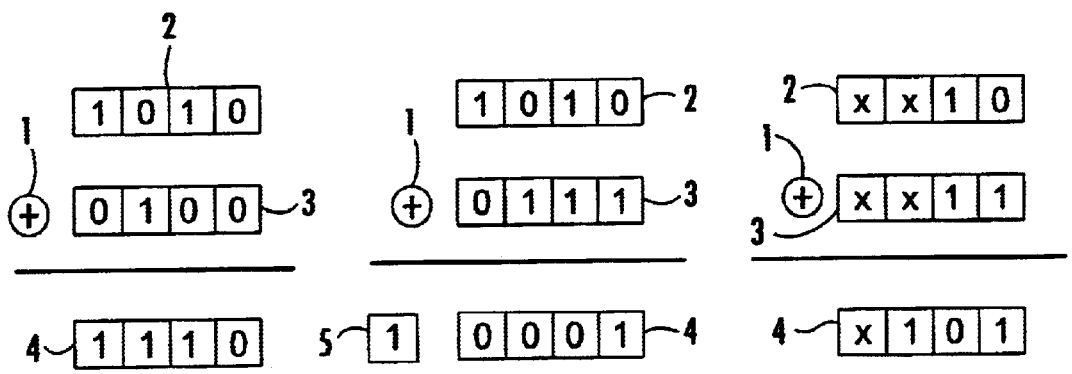
FIG. 1a (PRIOR ART)  FIG. 1b (PRIOR ART)  FIG. 1c (PRIOR ART)
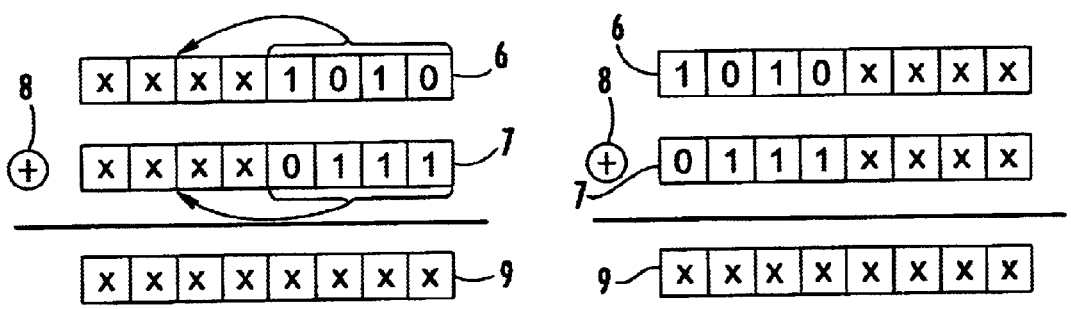
FIG. 2a (PRIOR ART)  FIG. 2b (PRIOR ART)
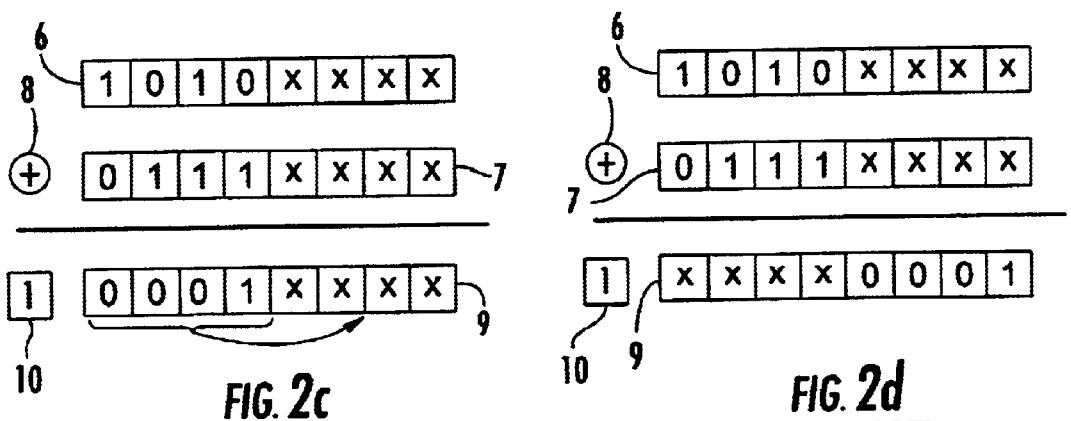
FIG. 2c (PRIOR ART)  FIG. 2d (PRIOR ART)

METHOD OF PERFORMING OPERATIONS WITH A VARIABLE ARITHMETIC

FIELD OF THE INVENTION

The present invention relates to data processing, and more particularly, to a method of performing operations with a variable arithmetic within a data processing system.

BACKGROUND OF THE INVENTION

Operators which can perform operations from operands of which the number of bits can vary are said to be of variable arithmetic. For instance, an adder which can carry out additions between operands coded on 16 bits or between operands coded on 24 bits is said to be of dual arithmetic: it is compatible with both a 16-bit arithmetic and a 24-bit arithmetic.

Special processors known as digital signal processors (DSPs) are designed specially for digital signal processing. DSPs are more particularly used for functions specific to processing digital signals, such as filtering or signal comparison. In some data processing systems, a DSP can be associated to a more powerful host processor to perform complex signal processing functions.

Some operations such as multiplication with accumulation are classical operations performed by DSPs: these operations involve multiplying together two binary numbers and adding, as the case arises, a third binary number to the result of that multiplication. In some digital signal processing algorithms used e.g. for carrying out Fourier transform calculations or for modeling finite impulse response filters or infinite impulse response filters, DSPs are excellent for multiplication operations with accumulation.

Some applications require great attention and precision especially for carrying out arithmetic operations. For instance, reproducing a high-fidelity sound can call upon calculations that bring into play numbers coded on more bits than required for calculations in simple voice transmissions. The increase in the number of bits involved in calculations leads to a greater degree of precision.

Conversely, there are other operations that call upon operations requiring calculations which involve numbers coded on a precise number of bits; for that type of operation, the possibility of working with numbers providing a better precision by virtue of a greater number of bits is not adopted. Sometimes, this possibility is even excluded for these operations. For instance, there exist communications standards in cellular telecommunication systems, such as the GSM standard in Europe, which impose numbers coded on 16 bits only, and which do not accept numbers coded on more than 16 bits even if that makes it possible to attain greater precision. On the other hand, numerous and recent multimedia applications dedicated to digital signal processing now demand a high degree of precision, especially for reproducing audio signals, all while being able to conform to the GSM standard in order to receive telecommunications that comply to that standard.

There thus arises the following problem: powerful operators, i.e. those working with numbers coded on a large number of bits, and less powerful operators, which must work with numbers coded on a number of bits imposed by certain standards, must coexist. Today, it is no longer possible to make a choice between these two types of operators, and hence between two different arithmetics. A solution would be to have two groups of distinct operators coexisting within the DSPs, each of the two groups operating with a different arithmetic. However, such a solution is penalizing in terms of cost and circuit space.

Moreover, there are some problems caused by the use of multiple arithmetic systems. Indeed, in the case where an operation is performed between two k-bit numbers, the result may take up k+1 bits. For operations performed with a single arithmetic, the k lowest weight bits are written into a result register. The last bit, which is the most significant bit, is called the outgoing carry over bit. For some applications, the presence of an outgoing carry over bit in the result of a given operation indicates that a saturation value has been attained and that, as a consequence, the result contained in the result register is no longer taken into account. It is thus important that the outgoing carry over bit is not written into the result register.

FIGS. 1a, 1b and 1c illustrate the problem that can arise. In FIG. 1a, an adder 1 performs an addition between a first 4-bit number of value 1010 stored in a first 4-bit input register 2, and a second 4-bit number of value 0100 stored in a second 4-bit register 3. The result of the addition, i.e. the number 1110, is contained in a result register 4. There is no outgoing carry over bit.

In FIG. 1b, the adder 1 performs an addition between a first 4-bit number of value 1010 stored in the first 4-bit input register 2 and a second 4-bit number of value 0111 stored in the second 4-bit input register 3. The result of the addition is 10001. This number is thus coded on five bits. The four lowest weight bits of that result are contained in the result register 4. The fifth bit corresponds to an outgoing carry over bit 5. Its presence activates a saturation unit within the electronic circuit managing the addition.

Thus, for example, if the result of the addition determines the sound volume level, a predetermined maximum amount shall be outputted. The four lowest weight bits of the result are then no longer taken into account. Likewise, there can exist a minimum predetermined value in the case where the result of an operation generates an outgoing carry over bit indicating a result which is less than what can be coded on a set number of bits.

In FIG. 1c, the adder 1 performs an addition between a first 2-bit number of value 10 stored in the first 4-bit input register 2, and a second 2-bit number of value 11 stored in the second 4-bit input register 3. The result of the addition is 101. This number is thus coded on three bits, all three bits being contained in the 4-bit result register. Now this addition was an addition performed in accordance with a 2-bit arithmetic using a 4-bit adder. Accordingly, the most significant bit of the result which, according to 2-bit arithmetic, should be the outgoing carry over bit, is kept in the result register. As a consequence, no saturation unit is activated.

These simple illustrations serve to show the possible existence of an outgoing carry over and the role it can play, as well as the problem arising from the use of a double arithmetic for recovering the outgoing carry over.

U.S. Pat. No. 5,598,362 proposes a method which implements a double arithmetic with a unique set of operators. In this patent, operations calling into play numbers coded on 16 bits or on 24 bits are performed with the same operators. However, the proposed solution requires an alignment of numbers prior to the operation. Thus, for instance, if two 4-bit numbers are to be added using an adder initially intended for adding numbers coded on 8 bits, it is necessary to abide by a set of steps shown in FIGS. 2a to 2d, which correspond to the following events:

in FIG. 2a, storing a first 4-bit number of value 1010 in a first 8-bit input register 6 and storing a second 4-bit number of value 0111 in a second 8-bit input register 7;

in FIG. 2b, shifting the first 4-bit number towards the most significant bits of the first 8-bit input shift register 6, and shifting the second 4-bit number towards the most significant bits of the second 8-bit input shift register 7;

in FIG. 2c, performing the addition using an 8-bit adder 8 and storing the obtained result of value 10001 in a result register 9; an outgoing carry over 10 is obtained in this example;

in FIG. 2d, shifting the 4 most significant bits of the obtained result towards the least significant bits of an 8-bit result register 9 which contains the result of the addition.

There is thus obtained the result of the addition of two 4-bit numbers performed with an 8-bit adder. The different shift operations are necessary to recover a possible outgoing carry over 10 which can thus be interpreted upon performing an addition. The outgoing carry over is sent to a saturation unit which enables a correct result to be obtained.

However, all these shift operations necessary to carry out the simplest of operations are very costly in terms of the execution time for the operation.

SUMMARY OF THE INVENTION

The method according to the invention makes it possible to overcome the different faults and drawbacks described above.

The invention relates to a process for implementing a double arithmetic: operators initially intended for performing operations on n-bit numbers can be utilized, by virtue of the inventive method, for performing those same operations on k bits, where n and k are natural integers such that k is less than or equal to n.

The method according to the invention implements means for performing operations with a variable arithmetic which require no shift operation for the input data of the operator. For example, to perform an addition of two numbers coded on 4 bits using an 8-bit adder, it is not necessary to shift the 4 bits of the two numbers towards the most significant bits of input registers of the operator. The result of the addition obtained is besides written directly in the lowest weight bits of the register containing the addition. Moreover, the method according to the invention implements means to recover a possible carry over which can activate a saturation unit of the DSP.

The invention thus relates to a method of performing operations with a variable arithmetic within a data processing system, including the steps of:

storing a first operand of k bits in a first input register of n bits;

storing a second operand of k bits in a second input register of n bits;

completing the n-k bits of each input register with sequences of bits ensuring, in a result register containing the result of the operation, a propagation of a possible outgoing carry over bit to recover the outgoing carry over at an output of the result register; and executing the operation.

According to a preferred embodiment of the invention, the sequences of bits ensuring the propagation of a possible outgoing carry over bit are specific to each operator. These sequences can also be representative of the arithmetic according to which the operation is executed.

According to a particular embodiment of the method according to the invention, the n-k highest weight bits of the result register containing the result of the operation are set to zero.

BRIEF DESCRIPTION OF THE DRAWINGS

The different aspects and advantages of the present invention shall be better understood upon reading the rest of the description with reference to the drawings, given purely as a non-limiting example, in which:

FIGS. 1a to 1c, already described, illustrate the possible existence of an outgoing carry over and the problems of recovering the latter in the case of a system operating according to several arithmetics;

FIGS. 2a to 2d, already described, illustrate an existing method for recovering an outgoing carry over in the case of a system operating according to several arithmetics.

DETAILED DESCRIPTION OF THE PREFERRED EMBODIMENTS

The remainder of the description shall make reference essentially to addition operations produced according a 4-bit/8-bit double arithmetic. However, it is clear that the method according to the invention is applicable to operations other than addition and in different arithmetics.

Figure 3A:
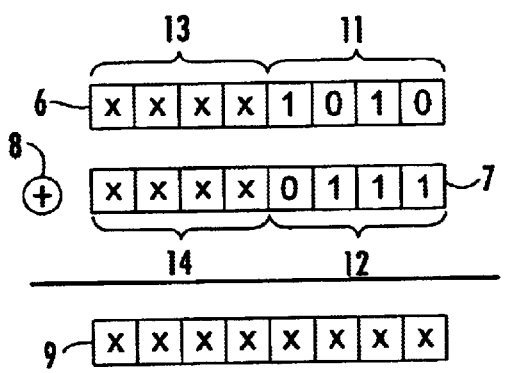
FIGS. 3a to 3c illustrate the method according to the invention for performing operations in the case of a system operating according to several arithmetics.
Figure 3B:
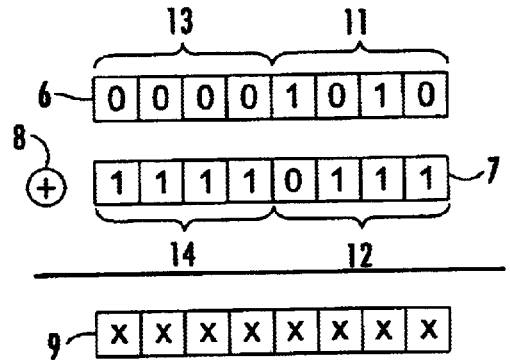
Figure 3C:
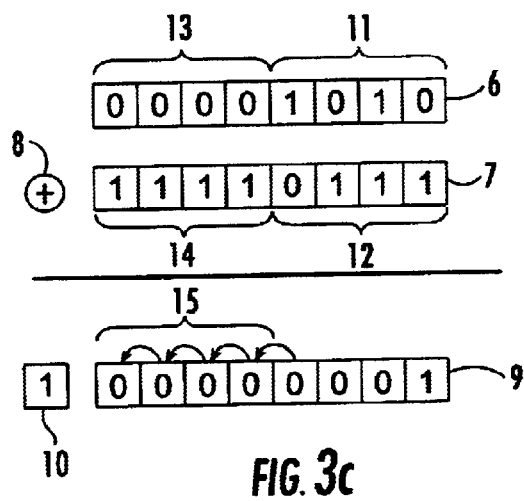

FIGS. 3a to 3c are illustrated in the context of the addition already described with reference to FIGS. 2a to 2d, i.e. for the case of an addition between a first number coded on 4 bits of value 1010 and a second number coded on 4 bits of value 0111.

In FIG. 3a, the first number is stored in the first 8-bit input register 6 and the second number is stored in the second 8-bit input register 7. The two numbers occupy the four lowest weight bits of these two registers. Each input register can thus be broken down into two parts: a first part 11 and 12, respectively corresponding to the lowest weight bits of the first input register 6 and of the second input register 7, which contains the numbers to be added by the adder 8. This part shall be termed the useful part. A second part 13 and 14, corresponding to the highest weight bits respectively of the first input register 6 and of the second input register 7, is a zone that does not serve to store the two numbers to be added. This part shall be termed the empty part.

In FIG. 3b, the empty parts 13 and 14 of the two input registers are completed with sequences of numbers. Thus, the empty part of the first input register is completed with the sequence 0000 and the empty part of the second input register is completed with the sequence 1111.

In FIG. 3c, there is performed the addition of the two numbers contained in the two input registers. The result is obtained in the result register 9. The result register 9 has a capacity of 8 bits and is completed with a 1-bit carry over register 10. In this example, the four lowest weight bits of the result register 9 have the value 0001. The four highest weight bits of the result register have the value 0000. The carry over register takes the value 1. This means that an outgoing carry over must be taken into account by the circuit managing the addition. The presence of an outgoing carry over indicates that the magnitude associated with the result of the addition shall adopt a saturation value. The result of the addition contained in the result register 9 is thus no longer important in itself. However, in the case where no outgoing carry over is obtained, the result of the addition contained in the result register can be read directly in the 4 lowest weight bits of the result register. It can be noted that no shift operation is necessary to obtain the result of the operation performed.

A propagation 15 of the outgoing carry over is ensured by virtue of sequences of numbers selected for completing the empty parts 13 and 14 of the first and second input registers 6 and 7.

In certain applications of the invention, the result of the operation can be read directly on the set of bits of result register 9. To this end, the highest weight bits of the result register 9 are set to zero. These bits are those which correspond to the empty parts of the input registers. Thus, for instance, if an operation is performed for several 16-bit operands contained in 24-bit registers, it will be the 8 (24−16=8) highest weight bits of the result register that shall be set to 0. The result obtained throughout the result register is thus independent of the sequences of numbers added to the empty parts 13 and 14 of the two input registers.

The method that has just been described can of course be generalized to any other arithmetic operation. When operations other than addition are performed, appropriate sequences of numbers are written in the empty parts of the input registers in order to ensure a propagation of the outgoing carry over so as to recover the latter at the output of the result register.

The number of bits of the input registers can also be variable without upsetting the implementation of the inventive method. For fixed-size input registers, the empty parts to be completed by sequences of numbers can also be of variable size. Thus, with 24-bit input registers, it is possible to carry out operations with numbers of 8, 12, 16, . . . bits.

According to a particular implementation of the inventive method, the bit sequences which complete the empty parts of the input registers can signify the arithmetic with which the operation is performed, while ensuring in all cases a propagation of a possible outgoing carry over in the result register. It has been shown in the example described in FIGS. 3a to 3c that in order to add two 4-bit numbers contained in 8-bit registers, the empty part 13 of the first input register 6 is completed by the sequence 0000, and the empty part 14 of the second input register 7 is completed by the sequence 1111. Two perform an addition between two 6-bit numbers contained in the 8-bit input registers 6 and 7, the two bits of the empty part 13 can be completed for example by the sequence 01 and the two bits of the empty part 14 can be completed by the sequence 10. The propagation of a possible outgoing carry over is then equally assured. The possibility of completing, for a same operator, the empty parts of the input registers by sequences which do not necessarily have the same structure can be exploited e.g. by error detection systems.

That which is claimed is:

1. A method of performing an operation with a variable arithmetic in a data processing system, comprising:

storing a first operand of k bits in a first input register of n bits;

storing a second operand of k bits in a second input register of n bits;

completing n-k bits of each input register with sequences of bits to ensure, in a result register containing the result of the operation, a propagation of an outgoing carry over bit to recover the outgoing carry over bit at an output of the result register; and executing the operation.

2. A method according to claim 1, wherein the sequences of bits ensuring the propagation of the outgoing carry over bit are operator specific.

3. A method according to claim 1, wherein the sequences of bits ensuring the propagation of the outgoing carry over bit are representative of the arithmetic according to the operation being executed.

4. A method according to claim 1, wherein n-k highest weight bits of the result register containing the result of the operation are set to zero.

5. A method of performing an operation in a data processing system, comprising:

storing a first operand of k bits in a first input register of n bits, n being greater than k;

storing a second operand of k bits in a second input register of n bits;

completing empty bits of each input register with sequences of bits to ensure, in a result register containing the result of the operation, a propagation of an outgoing carry over bit; and executing the operation.

6. A method according to claim 5, wherein the sequences of bits ensuring the propagation of the outgoing carry over bit are operator specific.

7. A method according to claim 5, wherein the sequences of bits ensuring the propagation of the outgoing carry over bit are representative of the arithmetic according to the operation being executed.

8. A method according to claim 5, wherein n-k highest weight bits of the result register containing the result of the operation are set to zero.

9. A method of performing an operation in a data processing system, comprising:

storing a first operand of k bits in a first input register of n bits, n being greater than k;

storing a second operand of k bits in a second input register of n bits;

completing empty bit positions of each input register with sequences of bits;

executing the operation; and storing a result of the operation in a result register;

the sequences of bits ensuring a propagation of an outgoing carry over bit in the result register.

10. A method according to claim 9, wherein the sequences of bits ensuring the propagation of the outgoing carry over bit are operator specific.

11. A method according to claim 9, wherein the sequences of bits ensuring the propagation of the outgoing carry over bit are representative of the arithmetic according to the operation being executed.

12. A method according to claim 9, wherein n-k highest weight bits of the result register are set to zero.

13. A method according to claim 9, wherein the operation is addition.

* * * * *